United States Patent [19]

Petersen

[11] 4,287,910

[45] Sep. 8, 1981

[54] TANK PRESSURE AND VACUUM RELIEF MECHANISM

[75] Inventor: Frank H. Petersen, Warren, Pa.

[73] Assignee: Betts Machine Company, Warren, Pa.

[21] Appl. No.: 60,300

[22] Filed: Jul. 25, 1979

[51] Int. Cl.³ .......................................... F16K 17/196
[52] U.S. Cl. ................................. 137/493.9; 220/204
[58] Field of Search ............... 137/493.3, 493.4, 493.5, 137/493.6, 493.9; 220/203, 204

[56] References Cited

U.S. PATENT DOCUMENTS

| | | | |
|---|---|---|---|
| 1,498,358 | 6/1924 | Dekrafft | 137/493.9 |
| 1,560,272 | 11/1925 | McAusland | 137/493.9 X |
| 2,349,137 | 5/1944 | Brown | 137/493.9 UX |
| 3,939,866 | 2/1976 | Pignatelli | 137/493.4 |

Primary Examiner—Robert G. Nilson
Attorney, Agent, or Firm—Baldwin, Egan, Walling & Fetzer

[57] ABSTRACT

A tank pressure and vacuum relief mechanism for relieving excess pressure or vacuum in a tank interior. The mechanism includes a housing disposed in a wall of the tank, such housing containing a one-way, normally-closed pressure relief valve for venting excessive pressure in the tank to the atmosphere. The housing also contains a one-way, normally-closed vacuum relief valve for admitting atmospheric pressure to the tank interior to relieve excessive vacuum therein. The mechanism seals completely on tank roll-over at any angle to prevent tank product leakage.

9 Claims, 6 Drawing Figures

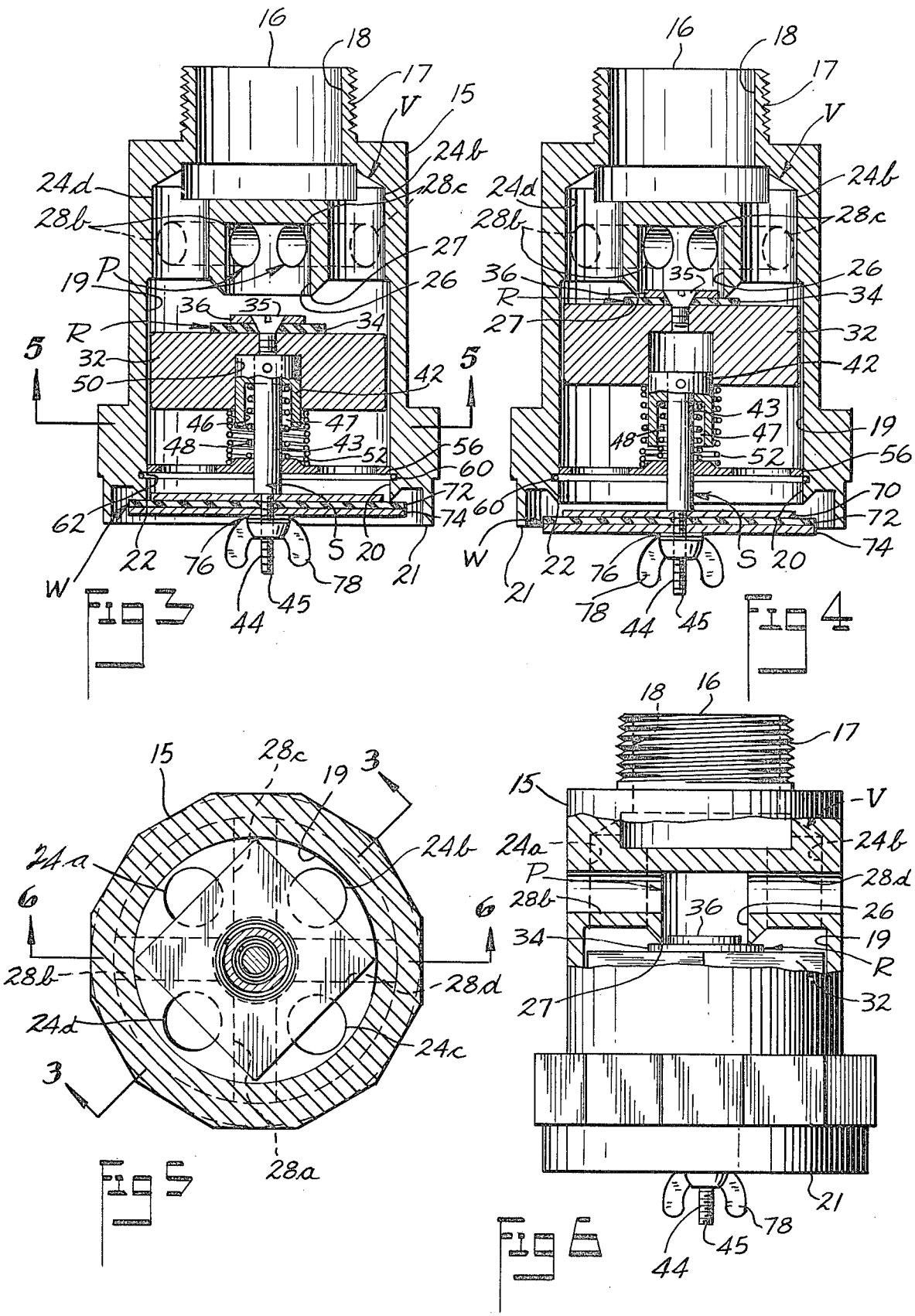

TANK PRESSURE AND VACUUM RELIEF MECHANISM

This invention relates to relief valves and more particular to a tank relief valve mechanism for relieving excessive pressure or vacuum in the tank interior.

BACKGROUND OF THE INVENTION

There has long been a need for a simple unitary relief valve mechanism that efficiently relieves excessive pressure or vacuum in a transportation tank or the like. There are many stringent requirements for such a valve. It must contain a number of fail-safe features. In the event of tank roll-over at any angle, for example, the valve must seal completely to prevent any leakage of the product. Additionally, such mechanism must prevent product surge from opening the valve in case of sudden stops. Internal tank vacuum must be sufficiently relieved on fast unloading. On either excessive pressure or vacuum, the action of the valve must be quick and positive. The valve must perform efficiently even with the presence of possible foreign matter in the product. Also, the valve must have maximum sealing seat life and must be unusually easy to assemble and disassemble.

SUMMARY OF THE INVENTION

Therefore, it is an object of the invention to provide a tank relief valve that relieves excessive pressure or vacuum from the tank interior.

A further object of the invention is to provide a valve of the above type that seals completely and prevents product pressure from opening the valve in case of tank roll-over at any angle.

A further object of the invention is to provide a valve of the above type that has maximum sealing seat life, and is quickly responsive even with the presence of possible foreign matter in the product.

A further object of the invention is to provide a valve of the above type that is very easy to assemble and disassemble.

A further object of the invention is to provide a valve of the above type that is simple in construction, inexpensive to manufacture, and highly effective in operation.

Briefly, the foregoing objects are accomplished by the provision of a tank pressure and vacuum relief mechanism for relieving excess pressure or vacuum in a tank interior including an elongated housing having an outer end secured in a coating associated tank wall aperture in an upper wall of an associated tank interiorly thereof with the inner end of the housing disposed in the tank interior. The housing has a longitudinal bore having a vacuum opening at its inner end communicating with the tank interior and forming a vacuum valve seat thereat. The housing has a vacuum passageway connecting the bore with the tank wall aperture whereby the bore is in communication with the atmosphere exteriorly of the tank. The bore has a pressure opening at its upper end forming a pressure valve seat, which communicates with a pressure passageway connecting the pressure opening with the tank interior. An elongated stem is positioned longitudinally in the bore. A normally-closed pressure relief valve is operatively disposed in the housing bore and on the outer end of the stem and is selectively reciprocable toward and away from the pressure valve seat for controlling fluid flow through the pressure opening and pressure passageway. A normally-closed vacuum relief valve is operatively disposed on the stem adjacent its inner end and is selectively reciprocable toward and away from the vacuum valve seat for controlling fluid flow through the vacuum opening and vacuum passageway. Pressure bias means is operatively disposed on the stem for maintaining the pressure relief valve in a normally-closed position against the pressure valve seat. Vacuum bias means is operatively disposed on the stem for maintaining the vacuum relief valve in a normally-closed position against the vacuum valve seat. Planar retainer means is disposed transversely in the bore and is secured to the bore wall for retaining the pressure bias means and the vacuum bias means in compressed position in the bore. The retainer means also functions to guide the stem for longitudinal reciprocation in the bore, such bore being circular in transverse section. The pressure relief valve includes a square block longitudinally reciprocable in the bore and on said stem thereby enabling guided longitudinal reciprocation of the pressure relief valve in coaction with the retainer means to control fluid flow through the pressure opening. The block has a centrally disposed hole open at its end facing the stem. The stem has a piston head at its outer end reciprocably disposed in the hole for guiding reciprocation of the block on the stem. The pressure bias means is a compressed coiled spring compressed between the block and the retainer means. The vacuum bias means is a compressed coiled spring compressed between the piston head and the retainer means. The retainer means includes a spring retainer clip releasably secured to the wall of the bore in coaction with a perforated vacuum relief plate disposed between the clip and the pressure and vacuum bias means.

Other objects and advantages of the invention will be apparent from the following description taken in conjunction with the drawings wherein:

BRIEF DESCRIPTION OF THE DRAWINGS

FIG. 3 is a front elevational sectional view of the valve shown in FIG. 1, and also taken along the line 3—3 of FIG. 5 and showing the position of the parts therein when relieving excessive tank pressure, (the pressure relief valve being open);

FIG. 4 is a view similar to FIG. 3, but showing the position of the parts therein when relieving a vacuum within the tank, (the vacuum relief valve being open);

FIG. 5 is a view taken along the line 5—5 of FIG. 3; and

FIG. 6 is a view, partly in section, taken along the line 6—6 of FIG. 5.

In the drawings, like numbers and letters are used to identify like and similar parts throughout the several views.

DESCRIPTION OF PREFERRED EMBODIMENTS

Figure 1:
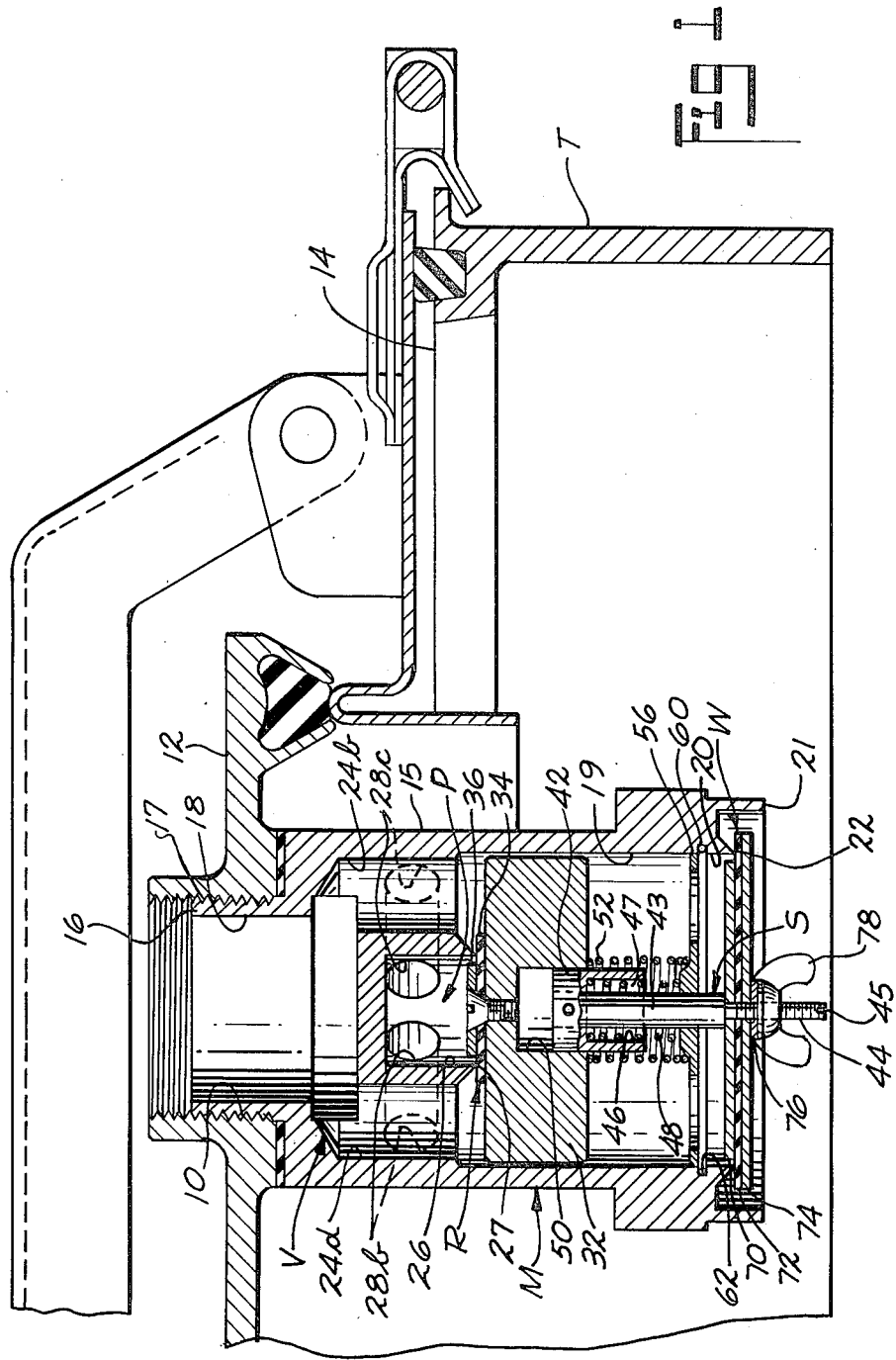
FIG. 1 is a portional front elevational sectional view of a pressure and vacuum relief valve mechanism constructed in accordance with the invention.

Referring to the drawings, there is shown a pressure and vacuum relief valve or mechanism of the invention, generally designated as M (FIG. 1), and disposed in a tank wall aperture 10 in a manhole cover 12, which is secured in the top wall 14 of a transportation tank T. Although the invention is shown as being secured in the manhole cover of a transportation tank, it will be understood that the valve V may be positioned in the top or upper portion of any type of tank designed for carrying fluids.

The valve mechanism M includes an elongated housing 15 having its outer end 16 formed of an exteriorly threaded sleeve portion 17, such sleeve portion being threadedly secured in the tank wall aperture 10, thus positioning the valve in the tank interior. The sleeve portion 17 has a sleeve bore 18 open at its outer or top end, thus communicating with the atmosphere exteriorly of the tank T. The housing 15 has a longitudinal main housing bore 19 having a vacuum opening 20 at the inner end 21 of the valve (in selective communication with the tank interior as will be hereinafter explained) and forming a vacuum valve seat 22 thereat.

As best shown in FIGS. 5 and 6, the valve housing 15 has four smaller preferably evenly spaced longitudinal bores 24a, 24b, 24c and 24d, which connect the main housing bore 19 with the sleeve bore 18. For purposes of brevity, the auxiliary bores 24a, 24b, 24c and 24d, are hereinafter collectively referred to as the vacuum passageway V (in coaction with the sleeve bore 18), (FIGS. 3, 4 and 6) which directly connects the upper portion of the main housing bore 19 with the atmosphere exteriorly of the tank T.

Figure 2:
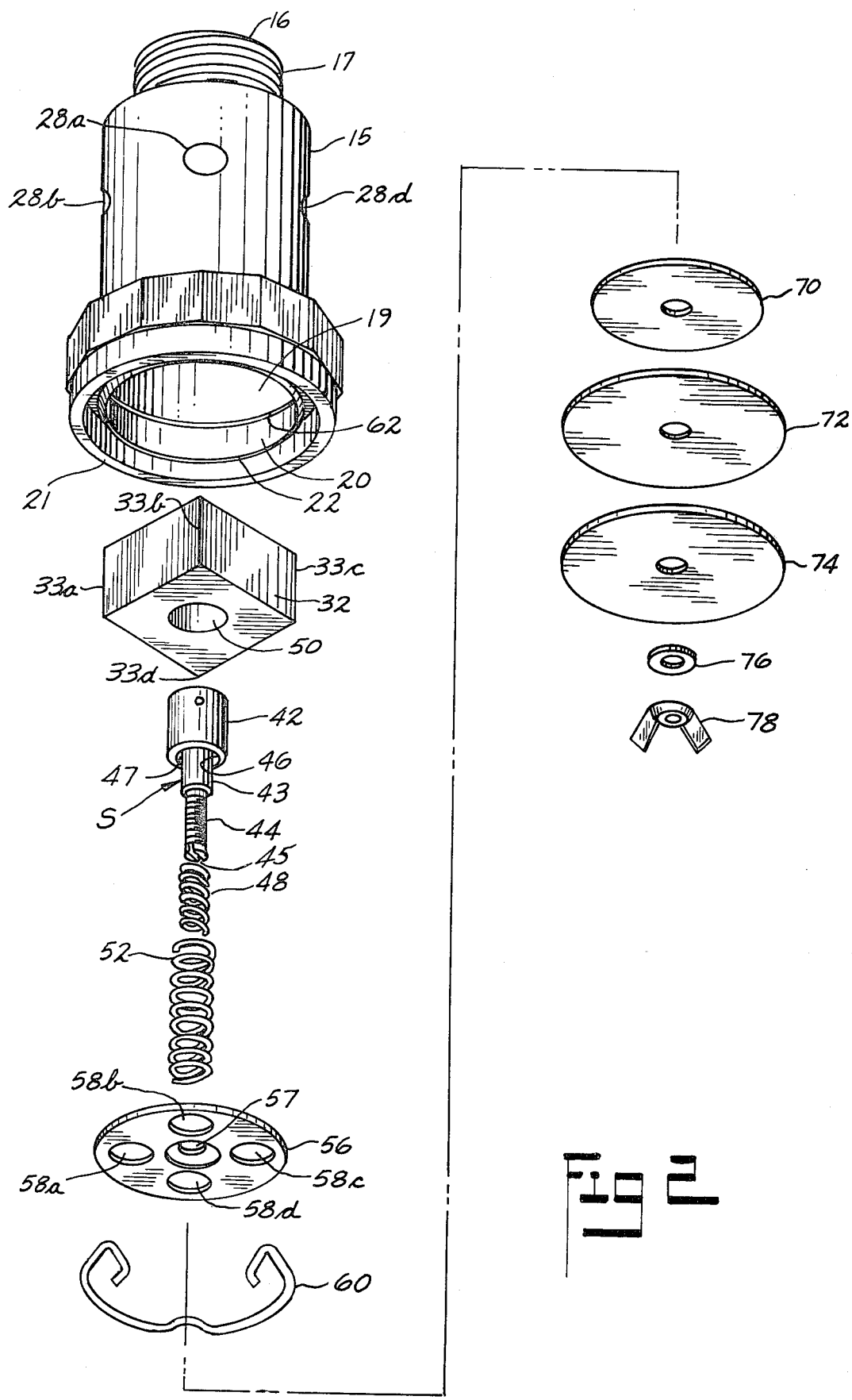
FIG. 2 is an exploded view of the valve shown in FIG. 1, and showing the parts thereof in position prior to assembly.

The housing 15 also has a pressure opening in the form of the restricted bore 26 (FIG. 3), which is open at its bottom end and is thus in communication with the main housing bore 19. The restricted bore 26 forms a pressure valve seat 27 at its lower end. Thus, the main bore 19 is provided with a restricted bore or pressure opening 26, forming the pressure valve seat 27. Formed in the side of the housing 15 (FIGS. 2, 3 and 5) are four preferably evenly spaced pressure bores 28a, 28b, 28c and 28d, which connect with the pressure opening 26, and thus connect the restricted bore or pressure opening 26 (and thus also the main housing bore 19), with the exterior of the valve housing 15 (i.e. the tank interior). For purposes of brevity, the pressure bores 28a, 28b, 28c and 28d are hereinafter collectively referred to as the pressure passageway P (FIG. 3), (in coaction with the pressure opening 26), which directly connects the upper portion of the main housing bore 19 with the tank interior.

A guide block 32 is slidably positioned in the main bore 19 (which is circular) for selective limited longitudinal reciprocation therein. Specifically, the four outer longitudinal edges 33a, 33b, 33c and 33d (FIG. 2) of the block contact the wall of the bore 19 with a snug sliding fit enabling the block to reciprocate longitudinally in the bore.

On the outer or top end of the block 32 is a sealing pressure disc 34 (FIG. 3) which is secured to the block by the bolt 35 and washer 36. When the guide block 32 is reciprocated to its upper position in the main bore 19 as shown in FIGS. 1, 4 and 6, the disc 34 contacts the pressure valve seat 27 to close the pressure passageway P. The combined structure of the block 32, disc 34, bolt 35, washer 36, and the coacting pressure valve seat 27 will be hereinafter referred to as the (one-way, normally-closed) pressure relief means or valve R, which opens inwardly or downwardly in the bore 19 and functions to control fluid flow through the pressure opening 26.

Positioned longitudinally in the main housing bore 19 is a stem S having a cylindrical piston-type head 42, an elongated rod portion 43 extending downwardly from the head 42, and a reduced threaded rod portion 44 extending downwardly from the rod portion 43 and having a screw driver slot 45 at its bottom free end. It will be noted that the stem head 42 has a bore 46, and the stem rod 43 extends into and is of lesser diameter than the bore 46 leaving a tubular space or spring well 47 therebetween for receiving the upper end portion of the vacuum bias means or stem vacuum relief coil spring 48.

The block 32 has a longitudinal hole or bore 50 open at the bottom or inner end of the block. The head 42 of the stem S is slidably disposed in the block bore 50 for selective limited reciprocation therein.

That portion of the stem head 42 which extends outwardly of the block bore 50 functions as a spring guide for receiving in telescopic fashion, the upper portion of the pressure bias means or pressure relief coil spring 52 therearound as shown in FIGS. 1, 3 and 4.

The stem or vacuum relief spring 48 is compressed between the stem head 42 and a planar retainer means in the form of a vacuum relief plate 56. The plate 56 has a centrally disposed aperture 57 for slidably receiving the stem S therethrough and thus guides such stem for limited longitudinal reciprocation in the main housing bore 19.

The pressure relief spring 52 is compressed between the block 32 and the perforated vacuum relief plate 56. The vacuum relief plate 56 is held in such biased position in the main housing bore 19 by the spring locking retainer clip 60 which is held in the annular groove 62 in the longitudinal wall of the main bore 19. Thus the plate 56 and the coacting clip 60 form a planar retainer means for compressing the springs 48 and 52. The plate 56 has holes 58a, 58b, 58c and 58d (of sufficient number and size for maximum open area) to permit air (i.e. fluid) flow past such plate.

Secured on the reduced threaded rod portion 44 of the lower end of the stem S is a retainer plate 70, a composition (preferably rubber) sealing vacuum disc 72 (which seats against the vacuum valve seat 22), and a support plate 74, all of which are retained on the stem by the lock washer 76 and the wing nut 78, which is threaded onto the stem reduced threaded rod portion 44. The combined structure of the retainer plate 70, sealing disc 72, support plate 74 and the coacting vacuum valve seat 22 will be hereinafter referred to as the (one-way, normally-closed) vacuum relief means or valve W, which opens outwardly of the bore 19 and functions to control air flow through the vacuum opening 20.

The spring 48, which is compressed between the stem head 42 and the vacuum relief plate 56, functions to bias the vacuum relief valve W against the vacuum valve seat 22 in a normally-closed position, as shown in FIGS. 1 and 3, (since the valve W is secured to the stem S).

The spring 52, which is compressed between the block 32 and the vacuum relief plate 56, functions to bias the pressure relief valve R against the pressure valve seat 27 in normally-closed position as shown in FIGS. 1 and 4.

In operation, excessive internal tank pressure is relieved by action of the pressure relief valve R (FIG. 3). Specifically, tank air pressure initially enters the valve housing 15 through the pressure bores 28a, 28b, 28c, 28d, (i.e. through the pressure passageway P), to pressure opening 26, where it forces the pressure relief valve R to open (against the action of the compressed coiled pressure relief spring 52), thence through the auxiliary bores 24a, 24b, 24c, 24d and the sleeve bore 18 (this is the vacuum passageway V), and out to the atmosphere exteriorly of the tank T. On tank roll-over, the weight of the block 32 coacts with the spring 52 to securely maintain the valve R in closed position, thereby preventing tank product leakage on such roll-over.

Excessive tank vacuum is relieved by the vacuum relief valve W. Specifically, atmospheric pressure flows in the sleeve bore 18, thence through the auxiliary bores 24a, 24b, 24c, 24d, (which is vacuum passageway V), thence through the housing main bore 19, thence past the block 32 (i.e. through the spaces between the sides of the block and the longitudinal wall of the bore 19), thence through the vacuum relief plate peripheral apertures 58a, 58b, 58c, 58d, thence to the vacuum relief valve W which is forced open by the incoming atmospheric pressure, and thence into the tank W to relieve the vacuum.

The cross-sectional area of the pressure opening 26 is no greater than the cross-sectional area of the pressure passageway P (i.e. no greater than the combined cross-sectional areas of the four pressure bores 28a, 28b, 28c, 28d). In other words, passage to the disc 34 is composed of four holes or bores 28a, 28b, 28c, and 28d equal in area to the seat diameter of pressure valve seat 27. Because of their size, these holes 28a, 28b, 28c and 28d help prevent product surge from opening the relief disc 34.

Thus, the invention provides a tank pressure and vacuum relief valve mechanism M for relieving excess pressure or vacuum in the interior of the tank T including an elongated valve housing 15 having an outer end 16 secured in a coacting associated tank wall aperture 10 in an upper wall 14 of an associated tank T interiorly thereof with the inner end 21 of the valve housing 15 disposed in the tank interior. The valve housing 15 has a main housing longitudinal bore 19 having a vacuum opening 20 at its inner end 21 communicating with the tank interior and forming a vacuum valve seat 22 thereat. The housing 15 has a vacuum passageway V connecting the main bore 19 with the tank wall aperture 10 whereby the bore 19 is in communication with the atmosphere exteriorly of the tank T. The bore 19 has a pressure opening 16 at its outer end forming a pressure valve seat 27. The housing 15 has a pressure passageway P connecting the pressure opening 26 with the tank interior. An elongated stem S is positioned longitudinally in the bore 19. A normally-closed pressure relief ring R is operatively disposed in the bore 19 and on the outer end of the stem and is selectively reciprocable toward and away from the pressure valve seat 27 for controlling air flow through the pressure opening 26 and the pressure passageway P. A normally-closed vacuum relief valve W is disposed on the stem S adjacent its inner end and is selectively reciprocable toward and away from the vacuum valve seat 22 for controlling air flow through the vacuum opening 20 and vacuum passageway P. Pressure bias means 52 is operatively disposed on the stem S for maintaining the pressure relief valve R in a normally-closed position against the pressure valve seat 27. Vacuum bias means 48 is operatively disposed on the stem S for maintaining the vacuum relief valve W in a normally-closed position against the vacuum valve seat 22. Planar retainer means 56 is disposed transversely in the bore 19 and is secured to the bore wall by the clip 60 for retaining the pressure bias means 52 and the vacuum bias means 48 in compressed position in the bore 19. The retainer means 56 also functions to guide the stem S for longitudinal reciprocation in the bore 19, such bore being circular in transverse section. The pressure relief valve R includes a square block 32 which is longitudinally reciprocable in the bore 19 and on the stem S thereby enabling guided longitudinal reciprocation of the pressure relief valve R in coaction with the retainer means 56 to control air flow through the pressure opening 26. The block 32 has a hole 50 open at its end facing the stem S. The stem S has a piston head 42 at its outer end reciprocably disposed in the hole 50 for guiding reciprocation of the block 32 on the stem S. The pressure bias means 52 is a compressed coiled spring compressed between the block 32 and the retainer means 56. The vacuum bias means 48 is a compressed coiled spring compressed between the piston head 42 and the retainer means 56. The retainer means 56 includes the spring retainer clip 60 releasably secured to the wall of the bore 19 and the perforated vacuum relief plate 56 disposed between the clip 60 and the pressure and vacuum bias means 52, 48.

To disassemble the valve, the blade of a screwdriver is inserted in the slot 45 of the stem S (to prevent the stem from rotating axially) after which the wing nut 78 is unscrewed from the stem portion 44. Next, the lock washer 76, the support plate 74, the sealing disc 72 and the retainer plate 70 are removed from the stem S in that order. Next, the ends of the clip 60 are pulled or pinched inwardly to remove such clip from its locked position in the groove 62, after which the relief plate 56 is removed from the bore 19. Next, the spring 52, the spring 48, the stem S and the block 32 are removed from the bore 19 in that order to complete disassembly. To assemble, the above steps are reversed.

Thus, the invention provides a highly effective relief valve mechanism for quickly relieving either excess pressure or vacuum from a tank interior. The valve seals completely on tank roll-over. Product surge will not open the valve. Both the pressure and vacuum relief valves function effectively even with the presence of foreign matter in the product. The mechanism has maximum sealing life and is most easy to assembly and disassemble without special tools.

The terms and expressions which have been used, are used as terms of description and not of limitation, and there is no intention in the use of such terms and expressions of excluding any equivalents of any of the features shown, or described, or portions thereof, and it is recognized that various modifications are possible within the scope of the invention claimed.

What is claimed is:

1. A tank pressure and vacuum relief mechanism for relieving excess pressure or vacuum in a tank interior comprising; an elongated valve housing having an outer end secured in a coacting associated tank wall aperture in an upper wall of an associated tank interiorly thereof with the inner end of the housing disposed in the tank interior, said housing having a longitudinal bore having a vacuum opening at its inner end communicating with the tank interior and forming a vacuum valve seat, said housing having a vacuum passageway connecting said bore with the tank wall aperture whereby the bore is in communication with the atmosphere exteriorly of the tank, said bore having a pressure opening at its outer upper end forming a pressure valve seat, said housing having a pressure passageway connecting said pressure opening with the tank interior, an elongated stem positioned longitudinally in said bore for limited longitudinal reciprocation therein, a normally-closed pressure relief valve operatively disposed in said bore and on the outer end of said stem and selectively reciprocable toward and away from said pressure valve seat for controlling fluid flow through said pressure opening and pressure passageway, a normally-closed vacuum relief valve disposed on the stem adjacent its inner end and selectively reciprocable toward and away from said vacuum valve seat for controlling fluid flow through said vacuum opening and vacuum passageway, pressure bias means operatively disposed on said stem for maintaining said pressure relief valve in a normally-closed position against said pressure valve seat, and vacuum bias means operatively disposed on said stem for maintaining said vacuum relief valve in a normally-closed position against said vacuum valve seat.

2. The structure of claim 1 and further including planar retainer means disposed transversely in the bore and secured to the bore wall for retaining said pressure bias means and said vacuum bias means in compressed position in the bore, said retainer means also functioning to guide said stem for longitudinal reciprocation in said bore.

3. The structure of claim 2 wherein said bore is circular in transverse section, and said pressure relief valve includes a square block longitudinally reciprocable in said bore and on said stem thereby enabling guided longitudinal reciprocation of the pressure relief valve in coaction with said stem and said retainer means to control fluid flow through said pressure opening.

4. The structure of claim 3 wherein said block has a block bore open at its end facing said stem, and said stem has a piston head at its outer end reciprocably disposed in said block bore for guiding reciprocation of the block on the stem.

5. The structure of claim 4 wherein said pressure bias means is a compressed coiled spring compressed between said block and said retainer means.

6. The structure of claim 4 wherein said vacuum bias means is a compressed coiled spring compressed between said piston head and said retainer means.

7. The structure of claim 2 wherein said retainer means includes a spring retainer clip releasably secured to the wall of the bore and a perforated vacuum relief plate disposed between the clip and said pressure and vacuum bias means.

8. The structure of claim 1 wherein the cross-sectional area of said pressure opening is no greater than the cross-sectional area of said pressure passageway.

9. A tank pressure and vacuum relief mechanism for relieving excess pressure or vacuum in a tank interior comprising; an elongated valve housing having an outer end secured in a coacting associated tank wall aperture in an upper wall of an associated tank interiorly thereof with the inner end of the housing disposed in the tank interior, said housing having a longitudinal bore having a vacuum opening at its inner end communicating with the tank interior and forming a vacuum valve seat thereat, said housing having a vacuum passageway connecting said bore with the tank wall aperture whereby the bore is in communication with the atmosphere exteriorly of the tank, said bore having a pressure opening at its outer end forming a pressure valve seat, said housing having a pressure passageway connecting said pressure opening with the tank interior, an elongated stem positioned longitudinally in said bore, a normally closed pressure relief valve operatively disposed in the bore and on the outer end of said stem and selectively reciprocable toward and away from said pressure valve seat for controlling fluid flow through said pressure opening and pressure passageway, a normally-closed vacuum relief valve operatively disposed on the stem adjacent its inner end and selectively reciprocable toward and away from said vacuum valve seat for controlling fluid flow through said vacuum opening and vacuum passageway, pressure bias means operatively disposed on said stem for maintaining said pressure relief valve in a normally-closed position against said pressure valve seat, vacuum bias means operatively disposed on said stem for maintaining said vacuum relief valve in a normally-closed position against said vacuum valve seat, planar retainer means disposed transversely in the bore and secured to the bore wall for retaining said pressure bias means and said vacuum bias means in compressed position in the bore, said retainer means also functioning to guide said stem for longitudinal reciprocation in said bore, said bore being circular in transverse section, said pressure relief valve including a square block longitudinally reciprocable in said bore and on said stem thereby enabling guided longitudinal reciprocation of the pressure relief valve in coaction with said retainer means to control air flow through said pressure opening, said block having a hole open at its end facing said stem, said stem having a piston head at its outer end reciprocably disposed in said hole for guiding reciprocation of the block on the stem, said pressure bias means being a compressed coiled spring compressed between said block and said retainer means, said vacuum bias means being a compressed coiled spring compressed between said piston head and said retainer means, said retainer means being a spring retainer clip releasably secured to the wall of the bore and a perforated vacuum relief plate disposed between the clip and said pressure and vacuum bias means.

* * * * *